(12) United States Patent
Henkel et al.

(10) Patent No.: US 9,988,941 B2
(45) Date of Patent: Jun. 5, 2018

(54) SHROUD DEVICE OF A JET ENGINE

(71) Applicant: Rolls-Royce Deutschland Ltd & Co KG, Blankenfelde-Mahlow (DE)

(72) Inventors: Martin Henkel, Berlin (DE); Igor Sola-Pardo, Berlin (DE); Matthias Manig, Doberlug-Kirchhain (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 308 days.

(21) Appl. No.: 14/847,596

(22) Filed: Sep. 8, 2015

(65) Prior Publication Data

US 2016/0069216 A1    Mar. 10, 2016

(30) Foreign Application Priority Data

Sep. 9, 2014   (DE) .................. 10 2014 112 954

(51) Int. Cl.
*F04D 29/44*   (2006.01)
*F01D 25/24*   (2006.01)
(Continued)

(52) U.S. Cl.
CPC .............. *F01D 25/24* (2013.01); *F01D 9/04* (2013.01); *F01D 9/044* (2013.01); *F01D 25/005* (2013.01);
(Continued)

(58) Field of Classification Search
CPC ........ F01D 25/24; F01D 25/005; F01D 9/044; F01D 9/04; F02C 3/04; Y02T 50/672; F05D 2230/60; F05D 2230/232
(Continued)

(56) References Cited

U.S. PATENT DOCUMENTS 5,740,674 A    4/1998   Beutin et al.
6,145,300 A   11/2000   Romani
(Continued)

FOREIGN PATENT DOCUMENTS

DE    69911416 T2    7/2004
EP    0761931 A1    3/1997

OTHER PUBLICATIONS

European Search Report dated Feb. 10, 2016 for related European Application No. 151183174.0.
(Continued)

*Primary Examiner* — Laert Dounis
*Assistant Examiner* — Kelsey Stanek
(74) *Attorney, Agent, or Firm* — Shuttleworth & Ingersoll, PLC; Timothy J. Klima (57) ABSTRACT

A shroud device of a jet engine, including a radially internal shroud appliance and a radially external shroud appliance. The internal shroud appliance is embodied with a radially internal ring-shaped shroud part and a radially external ring-shaped shroud part. The internal shroud appliance includes multiple blades that extend substantially in the radial direction between the internal shroud part and the external shroud part. The radially external shroud appliance is embodied with a radially internal ring-shaped shroud part and a radially external ring-shaped shroud part. The external shroud appliance includes multiple blades that extend substantially in the radial direction between the internal shroud part and the external shroud part. The internal shroud appliance is embodied as a first one-piece cast structural component and the external shroud appliance is embodied as a second one-piece cast structural component.

18 Claims, 4 Drawing Sheets

(51) Int. Cl.
    *F01D 25/00*     (2006.01)
    *F02C 3/04*     (2006.01)
    *F01D 9/04*     (2006.01)

(52) U.S. Cl.
    CPC .......... *F02C 3/04* (2013.01); *F05D 2230/232* (2013.01); *F05D 2230/60* (2013.01); *Y02T 50/672* (2013.01)

(58) Field of Classification Search
    USPC .............................................. 415/200, 210.1
    See application file for complete search history.

(56) References Cited

U.S. PATENT DOCUMENTS

| | | | |
|---|---|---|---|
| 2002/0148216 A1* | 10/2002 | Brault | F01D 17/105 60/226.1 |
| 2005/0022501 A1 | 2/2005 | Eleftheriou et al. | |
| 2011/0073745 A1 | 3/2011 | Duchatelle et al. | |
| 2013/0011246 A1* | 1/2013 | Todorovic | F02K 3/06 415/177 |
| 2013/0177410 A1* | 7/2013 | Eleftheriou | F01D 25/24 415/208.1 |
| 2014/0165534 A1* | 6/2014 | Hasel | F02C 3/107 60/226.1 |

OTHER PUBLICATIONS

German Search Report dated May 28, 2015 for related German Application No. 10 2014 112 954.7.
European Exam Report dated Jan. 25, 2017 from counterpart EP App No. 15183174.0.

\* cited by examiner

SHROUD DEVICE OF A JET ENGINE

This application claims priority to German Patent Application 102014112954.7 filed Sep. 9, 2014, the entirety of which is incorporated by reference herein.

The invention relates to a shroud device of a jet engine comprising a radially internal shroud appliance and a radially external shroud appliance according to the kind as defined more closely in the generic term of the patent claim 1.

Jet engines as they are known in practice have multiple separate shroud parts, which during mounting of the jet engine are brought into an operative connection to each other in the axial direction of the jet engine. Such shroud parts may for example be configured as an inlet housing, a fan housing, an intermediate housing, a combustion casing or the like, that are arranged in the enumerated order starting from an end area of the jet engine that is located at the upstream-side towards the direction of the end area of the jet engine that is located at the downstream-side.

Here, the intermediate housing is embodied with four ring-shaped shroud parts that are arranged substantially concentrically to each other, wherein structured blades are arranged substantially in the radial direction between two radially internal shroud parts and a core stream channel of the jet engine is limited by these shroud parts at least in certain areas. Aerodynamic blades are arranged substantially in the radial direction between the two external ring-shaped shroud parts, wherein these shroud parts limit a bypass duct of the jet engine. A so-called torsion box is formed by the facing surfaces of the two shroud parts that are central as seen in the radial direction.

In known jet engines, the intermediate housing is embodied as a single-piece or one-piece cast structural component. A disadvantage of such a one-piece embodiment of the intermediate housing is that its manufacture is difficult and elaborate since hollow spaces that need to be provided, for example in the area of a so-called torsion box, are hard to access in an area between the bypass duct and the core stream channel and can only be manufactured with correspondingly complex cores. Due to coverings, additional areas may be present in such single-piece intermediate housings that cannot be designed to the desired extent. Further, with this kind of manufacturing, the intermediate housing must be made of one single material, so that it may be necessary to make more compromises with regard to the different material requirements in the individual areas of the shroud.

Further it is known from practice to assemble an intermediate housing from a plurality of individual components, wherein the shroud parts and the blades are respectively manufactured as individual parts, for example. However, intermediate housings that are embodied in this manner may entail an extremely elaborate mounting process.

It is the objective of the present invention to provide a shroud device of a jet engine which is easy to manufacture and does not entail elaborate assembly.

This objective is solved through a shroud device having features as disclosed herein.

What is proposed is a shroud device of a jet engine, comprising a radially internal shroud appliance and a radially external shroud appliance, wherein the internal shroud appliance is embodied with a radially internal ring-shaped shroud part and a radially external ring-shaped shroud part, which in the installation position of the shroud device at least in certain areas limit a core stream channel of the jet engine, and wherein the internal shroud appliance has multiple blades that are extending substantially in the radial direction of the shroud device between the internal shroud part and the external shroud part, wherein the radially external shroud appliance is embodied with a radially internal ring-shaped shroud part and a radially external ring-shaped shroud part, which in the installation position of the shroud device at least in certain areas limit a bypass duct of the jet engine, and wherein the external shroud appliance has multiple blades that extend substantially in the radial direction of the shroud device between the internal shroud part and the external shroud part.

According to the invention, the internal shroud appliance is embodied as a first one-piece cast structural component and the external shroud appliance as a second one-piece cast structural component.

In contrast to known shroud devices that are cast in one piece, the shroud device according to the invention can advantageously be manufactured in a more simple and weight-optimized manner while still being easy to mount thanks to being designed in only two parts. In particular, the easy manufacturability of the shroud device results from the better accessibility of the two-piece embodiment in a connection area of both shroud appliances, so that in contrast to a single-piece embodiment of the shroud device simpler cores can be inserted and fixated for the casting procedure. Altogether, thanks to the reduced size, the risk of undesired faulty casts is also reduced as compared to the production of the cast as a single-piece.

Due to the good accessibility of the connection area of the shroud appliance as compared to known single-piece embodiments, the structure that is formed in the connection area and is referred to as the torsion box can be optimized with regard to its shape. Moreover, it is not necessary, for example, that blades which take over structural functions are continuously guided through a core stream channel, the torsion box and a bypass duct for the purpose of achieving a sufficient degree of stability in the area of the torsion box. Further, the individual shroud appliances of the shroud device according to the invention are easier to rework than a shroud device that is embodied in one piece.

In addition, the shroud device according to the invention has the advantage that in contrast to a one-piece cast design different materials can be used for the internal shroud appliance and the external shroud appliance, and thus an optimal material combination can be chosen for the tasks that respectively have to be fulfilled and which differ from each other for the internal and the external shroud appliance.

As for assembling a jet engine that is embodied with a shroud device according to the invention, this, too, is very easy to perform, since the internal shroud appliance can be provided as a basis for assembling further components, and the external shroud appliance can be connected to the internal shroud appliance only at a later time after further elements have been assembled. Hereby, a good accessibility of the internal shroud appliance for the purpose of connecting further elements of the jet engine at the internal shroud appliance is ensured and assembling of these elements is not obstructed through the external shroud appliance. In addition, through the split embodiment of the shroud device according to the invention, any necessary replacement of the external shroud appliance which may be necessary after operation of the jet engine can also be performed in a correspondingly simple manner, because it is not necessary to remove the entire shroud device.

The shroud device according to the invention is particularly suited for use in engines with a thrust of the order of up to 45,000 pounds.

In an advantageous embodiment of the shroud device according to the invention it is provided that the internal shroud appliance is embodied with a light metal material, in particular a magnesium material, a titanium material or an aluminum material. If a magnesium material is used, the internal shroud appliance can be manufactured in a particularly cost-effective manner and can be designed so as to be particularly light. In contrast, an inner shroud appliance that is embodied with a titanium material is more expensive to manufacture, but entails lower follow-up costs. Independently of what material is used, the internal shroud appliance preferably comprises fastening appliances for the purpose of connecting an internal gear appliance, which is also referred to as an internal gear box, and the main bearings of the engine.

In an advantageous shroud device according to the invention, the external shroud appliance can be embodied with a light metal material, in particular a magnesium material, an aluminum material or a titanium material, or with a composite material, for example fiber-reinforced plastic material, since in the area of the external shroud appliance lower operating temperatures are present as compared to the internal shroud appliance.

If the internal shroud appliance and the external shroud appliance are embodied with the same or a similar material, they also have the same or similar expansion coefficients. In that case, an interaction of the internal and external shroud appliances in a connection area of the shroud appliances is unproblematic across the entire operating temperature range. If the shroud appliances consist of different materials, there is the option to choose that material variant that is most advantageous for the respective shroud appliance with regard to the expansion coefficient.

The internal shroud appliance and the external shroud appliance are connected to each other in particular via a connection device, wherein the internal shroud appliance and the external shroud appliance respectively comprise one connection appliance of the connection device. The connection device may for example be embodied in the form of flange devices and may be formed in such a manner that, in the area of the connection device, the internal shroud appliance and the external shroud appliance form a circumferential ring, a so-called torsion box, which has a closed profile with a substantially rectangular cross-section, for example. Here, the circumferential ring is limited by a radially external surface of the internal shroud appliance and a radially internal surface of the external shroud appliance.

In order to be able to perform assembly of the shroud device in an easy manner, the connection appliance of the internal shroud appliance and of the external shroud appliance respectively comprise one connection area that is located upstream and one connection area that is located downstream in the installation position of the shroud device, wherein the connection area of the internal shroud appliance that is located upstream has a smaller outer diameter as compared to the connection area of the internal shroud appliance that is located downstream, and the connection area of the external shroud appliance that is located upstream has a smaller inner diameter as compared to the connection area of the external shroud appliance that is located downstream. Thereby, the external shroud appliance can be slid onto the internal shroud appliance in the axial direction and connected to the internal shroud appliance in a simple manner during the mounting procedure.

In an advantageous embodiment of the shroud device according to the invention, for the purpose of achieving a simple fixation of the shroud appliances against each other and for the facilitation of an easy replacement of the external shroud appliance, it is provided that the internal shroud appliance and the external shroud appliance are connected to each other via a releasable connection, in particular a bolted connection or the like. For this purpose, attachment points for bolts may be provided that are distributed circumferentially in the area of the flange appliances, for example.

Alternatively or additionally, the internal shroud appliance and the external shroud appliance can also be connected to each other through at least one welded joint, wherein a welded joint is particularly easy to establish if the internal shroud appliance and the external shroud appliance are made of identical or similar materials.

In an advantageous embodiment of the shroud device according to the invention, the external shroud part of the internal shroud appliance and/or the internal shroud part of the external shroud appliance have at least one stiffening element. Hereby, a desired high degree of rigidity can be achieved in the area of the circumferential ring or the torsion box in an easy manner. The at least one stiffening element can in particular be arranged at those surfaces of the internal shroud appliance and/or of the external shroud appliance that are facing each other in the radial direction and is preferably cast-on to the respective shroud appliance. This can be done in a particularly simple manner thanks to the split embodiment of the shroud device, as the respective areas of the shroud appliances are easy to access during manufacture. The stiffening element can for example be embodied as a strutting or a rib, in particular as a so-called grid rib pattern, and/or it can have the shape of a honeycomb or a triangle.

In an advantageous embodiment of the shroud device according to the invention, the external shroud appliance comprises at least one connecting device for coupling the jet engine to an aircraft. The shroud device is in particular part of a so-called case-mounted engine, i.e. a jet engine which is connected to an aircraft via the shroud device that represents an intermediate housing. In such engines, the greater part of the forces occurring in the core area of the jet engine is diverted outwards, for example to a structure of an aircraft, through the intermediate housing via a support strut that can be brought into an operative connection with the external shroud part of the external shroud appliance. In addition, the external shroud appliance can also have connection points for the purpose of connecting an auxiliary appliances gear device.

When the external shroud appliance respectively has multiple blades that extend substantially in the radial direction of the shroud device between the internal shroud part and the external shroud part, wherein almost all blades are substantially embodied in a substantially identical manner, a shroud device is created that is advantageous with regard to aerodynamics and stability. The blades are preferably equally distributed in the circumferential direction of the shroud device, i.e. a distance between two respectively adjacent blades is respectively at least approximately constant, with preferably about 20 blades being provided. Principally also a different number of blades can be used, depending on the application case. The blades can be designed in such a manner that, in contrast to known jet engines, aerodynamic blades that are arranged upstream of the intermediate housing in the area of the bypass duct, so-called fan outlet guide vanes, can be waived.

As an alternative to that, it can also be provided that the external shroud appliance respectively has multiple structured blades that extend substantially in the radial direction of the shroud device between the internal shroud part and the external shroud part, as well as multiple aerodynamic blades, wherein the structured blades have an increased length in the axial direction of the shroud device as compared to the aerodynamic blades. Thanks to the aerodynamic blades and structured blades that are embodied in a different manner, the shroud device can be manufactured in a particularly flexible manner with regard to the desired aerodynamic and structural characteristics. Here, the distribution of the aerodynamic blades and structured blades can be chosen as desired, wherein preferably multiple aerodynamic blades respectively alternate with multiple structured blades as seen in the circumferential direction of the shroud device. Also with this embodiment, aerodynamic blades, so-called fan outlet guide vanes, that are arranged upstream of the intermediate housing in the area of the bypass duct can be advantageously waived.

In a particularly advantageous embodiment of the shroud device according to the invention, in the installation position of the shroud device, the ends of the aerodynamic blades that are located upstream as well as the ends of the structured blades that are located upstream lie in a cross-sectional plane that extends perpendicular to a central axis of the shroud device. A jet engine that is embodied with this kind of shroud device is aerodynamically optimized in a cross-sectional plane as compared to a known jet engine with aerodynamic blades and structured blades. As a consequence of the fact that the upstream-side ends of the aerodynamic blades and of the structured blades touch a cross-sectional plane, without penetrating it, however, a distance of all blades from the fan blades is respectively the same in the axial direction of the shroud device, so that any excitation of the fan through the blades is advantageously avoided during operation of the jet engine.

In order to achieve the described advantages, upstream-facing leading edges of the aerodynamic blades and the structured blades are embodied in an identical manner, wherein the leading edges of the aerodynamic blades as well as of the structured blades can be embodied so as to be straight-lined and touch the cross-sectional plane preferably across its entire radial extension. As an alternative to this, the leading edges of the aerodynamic blades and of the structured blades can preferably also be embodied so as to be contoured identically and have axial extensions that vary in the radial direction, wherein all upstream-side ends of the respective leading edge of the blades, i.e. the ends of the respective blades that are directed furthest upstream in the axial direction, touch the cross-sectional plane.

Even if an end area of the structured blades that is arranged upstream is embodied in a structurally identical manner to a first third of the aerodynamic blade which is embodied so as to be shortest in the axial direction, an aerodynamic optimization is achieved thanks to the proposed design of the upstream-side end areas of the aerodynamic blades and of the structured blades, as hereby, too, an excitation of the fan, as it may occur when the upstream-side end areas of the aerodynamic blades and the structured blades are designed in a manner differing from each other, is safely prevented.

In an advantageous embodiment of the shroud device according to the invention, the end areas of the structured blades that are embodied in a structurally identical manner and are arranged upstream extend across the entire axial length of that aerodynamic blade which is embodied with the shortest length. In principal it can also be provided that the structurally identical end area of the structured blades and of the aerodynamic blades has an intermediate value between a third and the entire length of the aerodynamic blade, for example a half, two thirds or three quarters.

In order to achieve a total weight of the shroud device that is as low as possible while also having the desired high strength values, it is advantageous when a length of the structured blades in the axial direction of the shroud device is at least 1.5 times as much as the length of the aerodynamic blades in the axial direction of the shroud device.

The higher the ratio of the length of the structured blades to the length of the aerodynamic blades in the axial direction of the shroud device, the better the shroud device can be embodied with the desired high strength values. Here, the structured blades can be embodied so as to have at least twice the length in the axial direction of the shroud device as the aerodynamic blades, but they can also have three times or four times the length, for example. The length ratio that is effectively selected can be chosen for the respective case of application in consideration of the installation space that is available in the axial direction of the shroud device.

It has turned out to be particularly advantageous when a ratio of the length of the structured blades to the length of the aerodynamic blades is particularly high in the axial direction of the shroud device. Here, the structured blades can be preferably embodied so as to have twice the length of the aerodynamic blades in the axial direction of the shroud device, but they can also be three times or four times as long, for example. The length ratio that is effectively selected can be chosen for the respective case of application in consideration of the stability requirements, while also taking into account the installation space that is available in the axial direction of the shroud device.

Further advantages and advantageous embodiments of the shroud device according to the invention follow from the patent claims and the exemplary embodiments that are described in principle in the following by referring to the drawings, wherein, with a view to clarity, the same reference signs are used for structural components with identical structures and functionality in the description of the different exemplary embodiments.

Herein.

Figure 1:
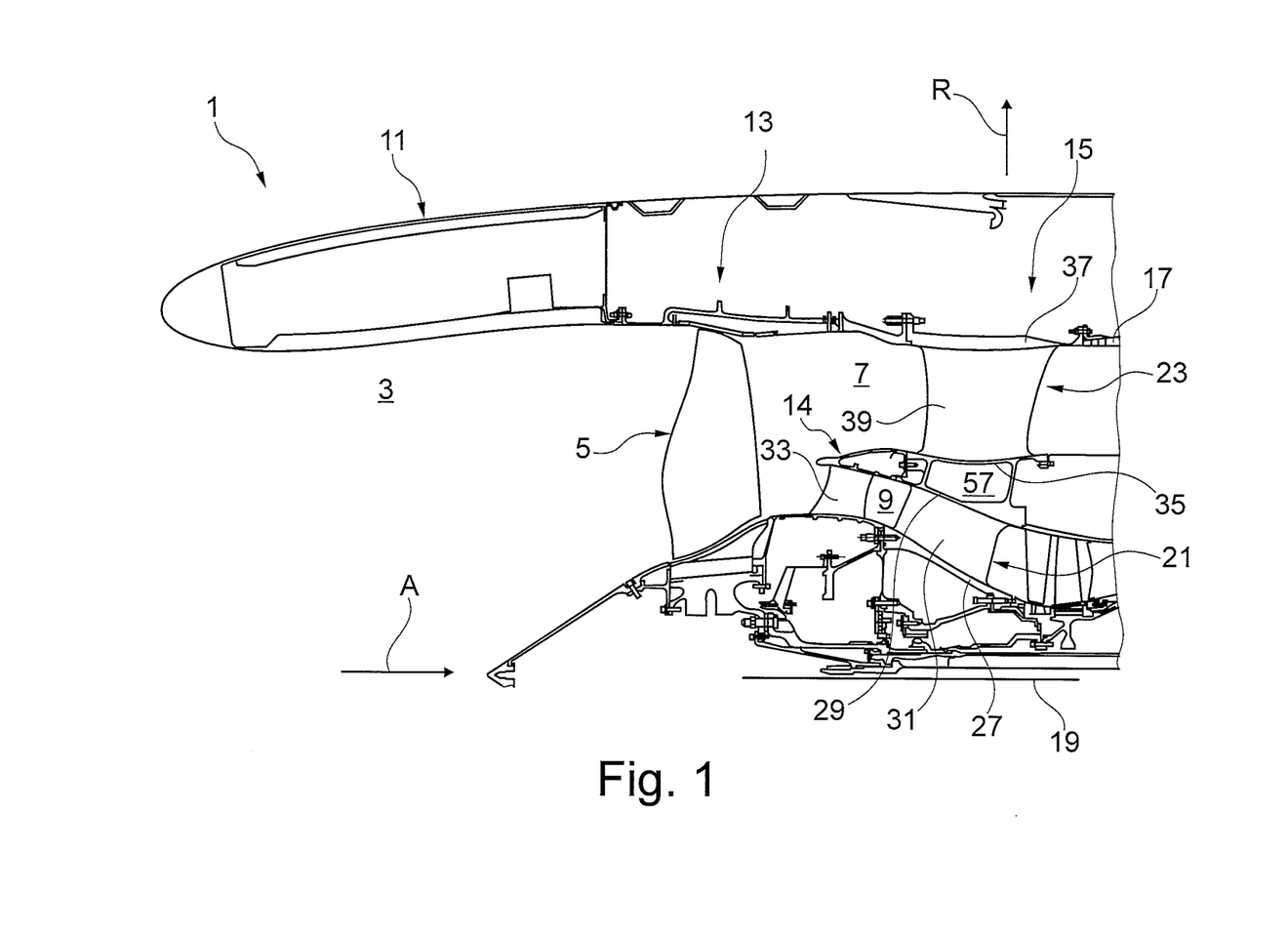
FIG. 1 shows a schematized longitudinal section view of an upstream-side area of a jet engine, comprising multiple shroud elements adjoining each other in the axial direction, wherein a shroud device that is referred to as an intermediate housing can be seen.
Figure 2:
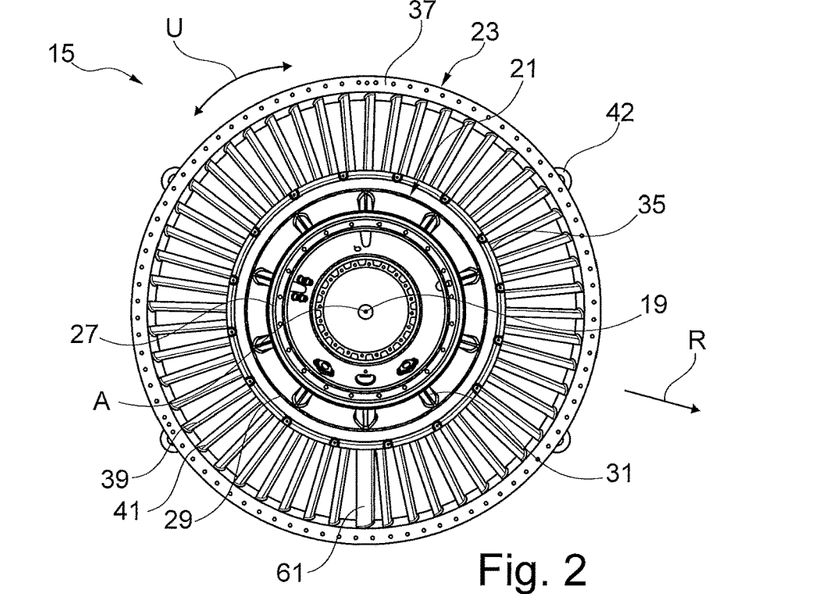
FIG. 2 shows a simplified front view of the intermediate housing of the jet engine of FIG. 1 in isolation.

FIG. 1 shows a longitudinal section view of a section of a jet engine or an aircraft engine 1, by means of which a thrust of the order of up to 45,000 pounds can be provided. The jet engine 1 has an inlet area 3, to which a fan 5 connects downstream in a per se known manner. In turn, downstream of the fan 5 a fluid flow in the jet engine 1 is divided into a bypass flow and a core stream, wherein the bypass flow flows through a bypass duct 7 and the core stream is guided through a core stream channel 9 into an engine core. The engine core is embodied in a manner that is not shown in more detail with a compressor device, a burner and a turbine appliance.

The jet engine 1 comprises multiple shroud elements that are adjoining each other and are connected to each other in the axial direction A of the jet engine 1. Here, the inlet area 3 that is arranged upstream is formed by an inlet housing 11, to which a fan housing 13 connects, which surrounds the fan 5 in a mounted state of the jet engine 1. Downstream of the fan housing 13, a shroud device 15 is in turn connected that is embodied as an intermediate housing and to which downstream a sheath flow housing 17 is connected in the present case.

In an alternative embodiment of the invention, the jet engine can be constructed in a different manner with regard to the number and the arrangement of the shroud elements. For example, less or more shroud elements than described above may be provided in the axial direction of the jet engine. In addition, there is also the option to embody individual shroud elements that are described above as multi-piece parts in the axial and/or the radial direction of the jet engine.

The jet engine 1 can be connected to an aircraft via the intermediate housing 15, so that loads that are occurring during operation of the jet engine 1 can be guided via the intermediate housing 15 to a support strut of the jet engine 1, that is not shown in more detail and can be brought into an operative connection with the intermediate housing 15, and deflected to a structure of the aircraft. Such a jet engine 1 is also referred to as a case-mounted engine.

In the following, a more detailed description of the intermediate housing 15 of the jet engine 1 is provided, that extends outward from a central axis 19 of the jet engine 1 or the intermediate housing 15 in the radial direction R of the jet engine 1, and by which at least one area of the core stream channel 9 and of the bypass duct 7 is limited in the radial direction R.

The intermediate housing 15 consists of two shroud appliances 21, 23 that are respectively embodied as one-piece cast structural components, which during mounting of the jet engine 1 are connected to each other via a connection device 25 that will be described in the following in more detail. The radially internal shroud appliance 21 has an internal ring-shaped shroud part 27 and an external ring-shaped shroud part 29 that encloses the internal ring-shaped shroud part 27 in the radial direction R. A part of the core stream channel 9 is respectively limited by facing surfaces of the two shroud parts 27, 29 in the radial direction R, wherein in the shown exemplary embodiment the shroud parts 27, 29 are connected to each other via ten blades 31 that can be seen in more detail in the following figures. The blades 31 that are distributed particularly in an even manner on the circumferential side and which are also referred to as struts, are aerodynamically formed in an upstream-side end area and in particular serve for the radially outward transfer of loads from the core area of the jet engine 1. There is the option to embody one, multiple or all of the blades 31 in a hollow manner for laying service lines from the internal shroud part 27 to the external shroud part 29 and/or for weight reduction. In addition, it can be provided that the internal shroud part 27 has a connection appliance for connecting an internal gear appliance, a so-called internal gear box.

Apart from the blades 31 of the internal shroud appliance 21 of the intermediate housing 15, upstream from it further blades 33 are provided in FIG. 1 in the area of the core stream channel 9, which are also arranged so as to be distributed on the circumferential side. In the present case, the further blades 33 are part of a guide blade housing 14 that is arranged upstream of the intermediate housing 15 and connected to the same.

The external shroud appliance 23 that radially surrounds the internal shroud appliance 21, just like the internal shroud appliance 21 has an internal ring-shaped shroud part 35 and an external shroud part 37 that is surrounding the internal shroud part 35 in the radial direction R, wherein a part of the bypass duct 7 is limited in the radial direction R by those surfaces of the shroud parts 35, 37 that are facing each other. The internal shroud part 35 and the external shroud part 37 in turn are connected to each other via the blades that are shown in more detail in FIGS. 2 to 6, wherein in the present case differently embodied blades are provided, namely structured blades 39 on the one side and aerodynamic blades 41 on the other side. The structured blades 39 as well as the aerodynamic blades 41 respectively fulfill aerodynamic and structural functions and are fixedly attached to the internal shroud part 35 as well as to the external shroud part 37, so that a stable connection is created and large forces can be transferred.

As an alternative to the shown embodiment, it can also be provided that all blades that are connecting the internal shroud part to the external shroud part are embodied substantially in a structurally identical manner.

For the purpose of transferring radially outward the forces and loads that occur during operation in the core area of the jet engine 1 in the area of the bypass duct 7 only blades 39, 41 are necessary that are arranged in a cross-sectional area of the intermediate housing 15. As compared to known embodiments, in which in a cross-sectional plane in the area of the bypass duct only aerodynamic blades are arranged and in a cross-sectional plane downstream to it only structured blades are arranged, in the shown embodiment structured blades 39 and aerodynamic blades 41 are integrated in one single cross-sectional area of the jet engine 1. In this manner, the jet engine 1 can be embodied so as to be very short in the axial direction A and compared to the embodiment comprising blades that are arranged so as to be displaced with respect to one another in the axial direction A of the jet engine where appropriate one major component that is surrounding the further blades can be economized.

The jet engine 1 can be connected to an aircraft via a connecting device 42 that is integrally connected with the external shroud part 37 of the external shroud appliance 23. Apart from the connecting device 42, the external shroud appliance 23 can also comprise connection points for the connection of an auxiliary device gear appliance.

In FIGS. 2 to 6, the intermediate housing 15 is respectively shown in isolation, wherein—in contrast to the rendering in FIG. 1, which is shown in a strongly simplified form in this area—the two-part configuration of the intermediate housing 15 can be seen in more detail with the internal shroud appliance 21 and the external shroud appliance 23.

Through the divided embodiment of the intermediate housing 15, with the internal shroud appliance 21 that is embodied as a one-piece cast structural component and the external shroud appliance 23 that is also embodied as a one-piece cast structural component, the shroud appliances 21, 23 can be manufactured in an easier manner by means of a casting method thanks to a design that is less complex as compared to an intermediate housing that is embodied in one piece, in particular in a connection area of the shroud appliances 21, 23, but also due to the respectively smaller and easier-to-access embodiment of the shroud appliances 21, 23. In addition, it is principally possible to use materials for the internal shroud appliance 21 and the external shroud appliance 23 that are respectively adjusted to the framework conditions that have to be met, wherein it is also possible to use different materials for the internal shroud appliance 21 and the external shroud appliance. In the present case, the internal shroud appliance 21 as well as the external shroud appliance 23 are embodied with a titanium material.

For connecting the internal shroud appliance 21 with the external shroud appliance 23, the internal shroud appliance 21 and the external shroud appliance 23 respectively have a connection appliance 43 or 45 of the connection device 25 that are embodied as a flange appliance, and that comprise a connection area that is arranged upstream and a connection area that is arranged downstream, respectively. Here, a connection area 47 of the internal shroud appliance 21 that is located upstream has an outer diameter that is smaller as compared to the connection area 49 of the internal shroud appliance 21 that is located downstream. In contrast to that, a connection area 51 of the external shroud appliance 23 that is located upstream is embodied with a smaller inner diameter as compared to the connection area 53 of the external shroud appliance 23 that is located downstream. In this manner, the external shroud appliance 23 can be easily slid in the axial direction A of the jet engine 1 onto the internal shroud appliance 21 from a side that is facing upstream in the installation position of the internal shroud appliance 21, and connected to the internal shroud appliance 21 during mounting of the jet engine 1.

In the present case, for the purpose of connecting the internal shroud appliance 21 to the external shroud appliance 23, attachment points are provided that are arranged in a circumferentially distributed manner in the area of the upstream-facing connection areas 47, 51 as well as in the area of the downstream-facing connection areas 49, 53, by means of which the shroud appliances 21, 23 can be fastened against each other, which in the present case is effected by means of a bolted connection 55. By providing such a releasable connection, not only the mounting of the jet engine 1, but also the replacement of the external shroud appliance 23, for example in the event of any damage to it, are rendered easy to carry out, wherein, in contrast to an intermediate housing that is embodied in one piece, it is no longer necessary to dismount the entire jet engine 1 in the event that the external shroud appliance 23 has to be replaced.

Alternatively or additionally, the internal shroud appliance 21 and the external shroud appliance 23 can also be connected to each other via a welded joint.

In the area of the connection device 25 of the intermediate housing 15, a so-called torsion box 57 of the jet engine 1 is formed by the external shroud part 29 of the internal shroud appliance 21 and the internal shroud part 35 of the external shroud appliance 23. The torsion box 57 is embodied with a closed profile, has a substantially rectangular cross-section here and runs around the central axis 19 of the jet engine 1 in a substantially ring-shaped manner. Through the division of the intermediate housing 15 into the internal shroud appliance 21 and the external shroud appliance 23, the areas of the shroud appliances 21, 23 that form the torsion box 57 in a mounted state can be easily accessed during manufacture of the respective shroud appliance 21, 23, so that the external shroud part 29 of the internal shroud appliance 21 as well as the internal shroud part 35 of the external shroud appliance 23 can be embodied in a simple manner with stiffening elements, gills, strutting or the like, which are not shown in any more detail, in order to achieve a desired high degree of rigidity in the area of the torsion box 57. The stiffening elements can be cast in a simple manner together with the respective shroud appliances 21, 23 during the manufacture of the same.

In the following, the structure, arrangement and distribution of the structured blades 39 and of the aerodynamic blades 41 of the external shroud appliance 23, which are embodied in the present case with solid material having a substantially constant material thickness of for example approximately 3 mm, are described in more detail.

Figure 4:
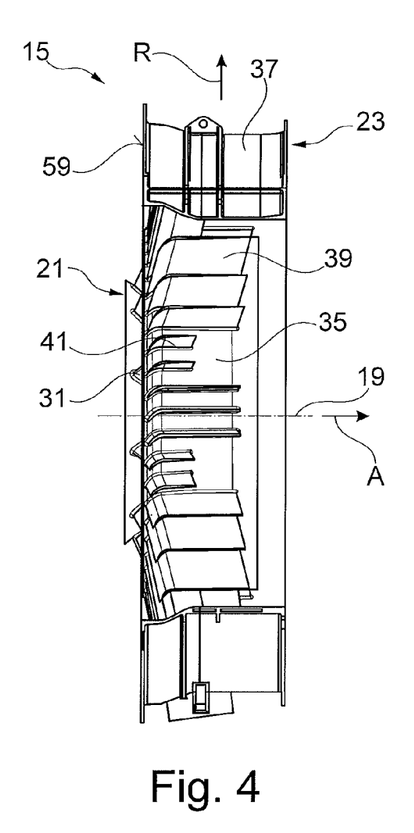
FIG. 4 shows a simplified side view of the intermediate housing of the jet engine of FIG. 1 to FIG. 3, wherein the intermediate housing is shown in a partially cut-away manner.
Figure 5:
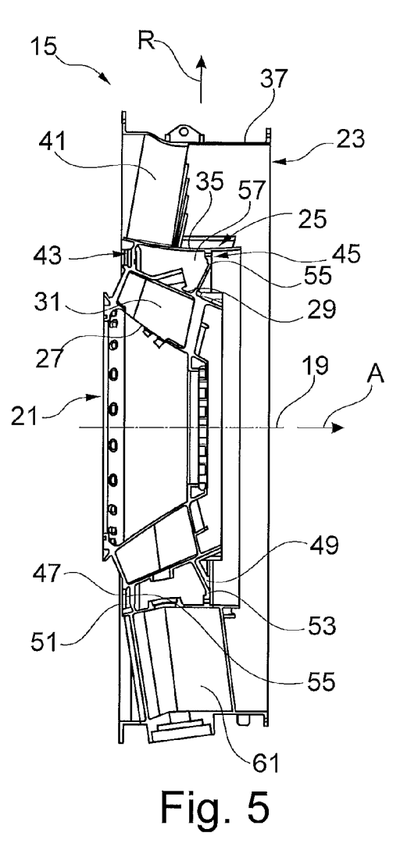
FIG. 5 shows a simplified sectional view of the intermediate housing of the jet engine of FIG. 1 to FIG. 4 along a longitudinal median plane of the intermediate housing.
Figure 6:
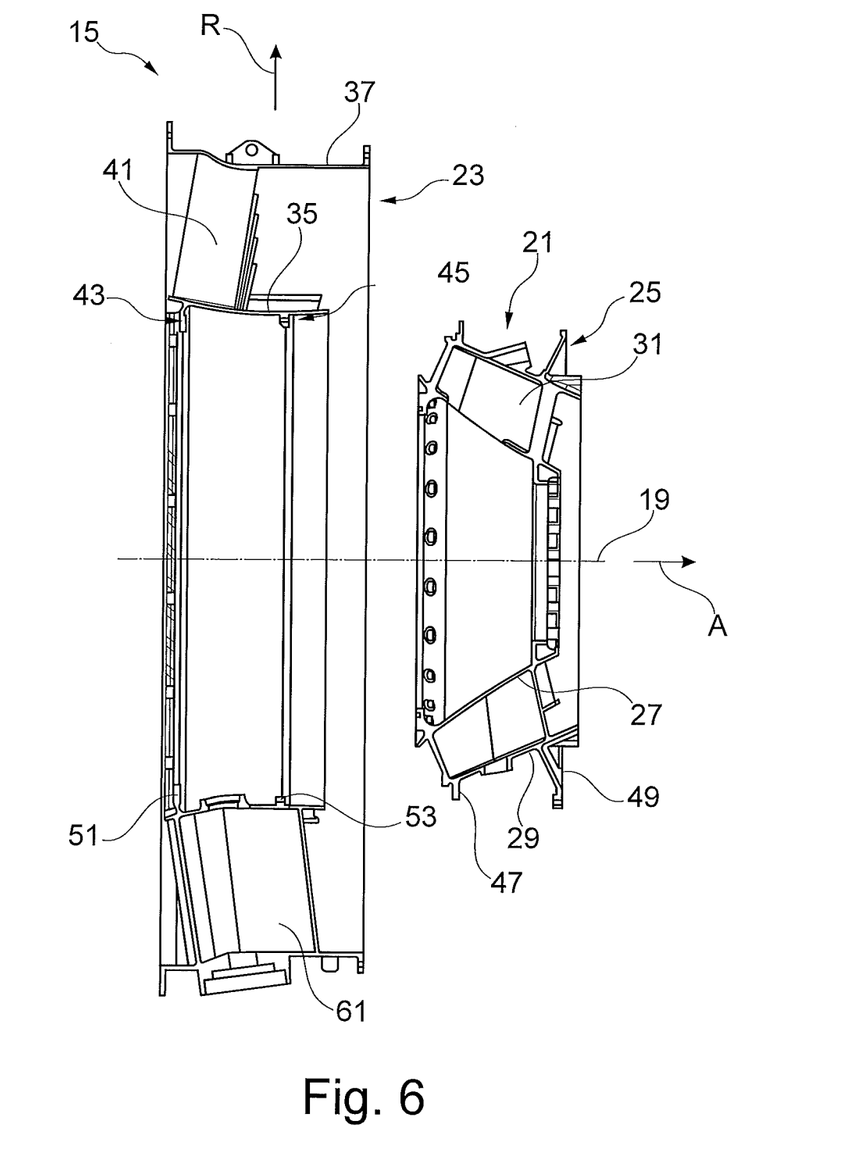
FIG. 6 shows a schematic exploded diagram of the intermediate housing of the jet engine of FIG. 1 to FIG. 5 in a sectional side view, wherein an internal shroud appliance and an external shroud appliance can be seen in more detail.

It can be seen in FIG. 4, for example, that all structured blades 39 are embodied in a structurally identical manner. Likewise, all aerodynamic blades 41 are embodied in a structurally identical manner. Further, it can be seen in particular from FIG. 4, that the ends of the structured blades 39 that are arranged upstream as well as the ends of the aerodynamic blades 41 that are arranged upstream respectively preferably directly adjoin a single cross-sectional plane 59 of the intermediate housing 15 or lie in the cross-sectional plane 59 across their entire radial extension. Thus, all structured blades 39 as well as all aerodynamic blades 41 touch the cross-sectional plane 59, without penetrating it, however. The blades 39, 41 all have a common start position as seen in the axial direction A of the jet engine 1 in flow direction, whereby a distance between the leading edges of the blades 39, 41 and the blades of the fan 5 is the same during operation of the jet engine 1, and the blades of the fan 5 are not excited by the structured blades 39 or the aerodynamic blades 41 in an undesired manner.

In an alternative embodiment of the invention, this effect can also be achieved by embodying the aerodynamic blades and the structured blades in such a manner that, in the area of their leading edges, they are contoured and have differing axial extensions in the radial direction, wherein an end of the respective blades which extends furthest upstream in the axial direction lies in a cross-sectional plane with the respective ends of the other blades. Here, the leading edges of the blades are preferably embodied and arranged in an identical manner.

As can also be seen in FIG. 4, in the present case the structured blades 39 are embodied so as to have twice the length in the axial direction A as the aerodynamic blades 41, wherein in the present case the structured blades 39 have an axial length of approximately 200 mm and the aerodynamic blades have an axial length of approximately 100 mm. Through this measure, losses are minimized and a favorable ratio of the total weight of the intermediate housing 15 to a desired small extension of the intermediate housing 15 in the axial direction A of the jet engine 1 is achieved.

In addition, it is provided that an end area of the structured blades 39 that is located at the upstream side is embodied so as to be identical to the entire embodiment of the aerodynamic blades 41 in the axial direction A. An intermediate housing 15 that is embodied in such a manner is advantageous during operation of the jet engine 1 in regards to aerodynamics.

Figure 3:
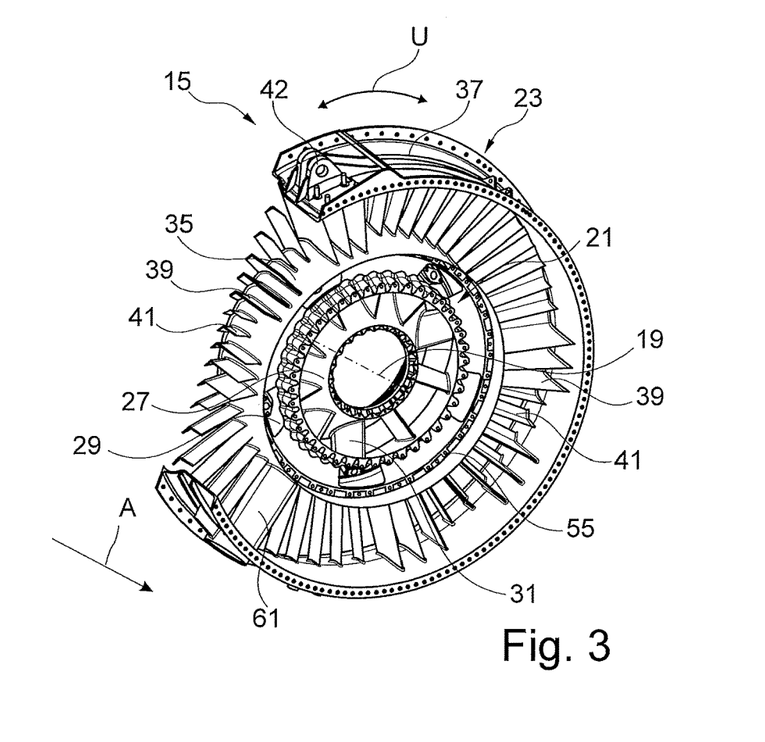
FIG. 3 shows a simplified perspective view of the intermediate housing of the jet engine of FIG. 1 and FIG. 2, wherein the intermediate housing is shown in a partially cut-away manner.

Further, it can be seen in particular from FIG. 3 and FIG. 4 how the structured blades 39 and the aerodynamic blades 41 are distributed in the circumferential direction U of the intermediate housing 15, wherein the structured blades 39 are preferably arranged in positions where large loads have to be transferred. Here, the structured blades 39 and the aerodynamic blades 41 can be arranged so as to alternate with each other. However, in the present case respectively multiple structured blades 39 as well as aerodynamic blades 41, for example two, three, four or multiple similar blades 39 or 41, are arranged next to each other in certain areas in the circumferential direction U.

Apart from the structured blades 39 and the aerodynamic blades 41, what can also be provided is another blade 61 that is embodied in a hollow manner, a so-called king strut, through which a radial shaft of an auxiliary device gear appliance or the like can be guided from an area of the torsion box 57 towards the direction of the external shroud part 37 of the external shroud appliance 23, for example.

Apart from the shown distribution of structured blades 39 and aerodynamic blades 41, what can in particular also be provided in an advantageous embodiment of the invention are 40 aerodynamic blades and twelve structured blades including the king strut, which can be arranged so as to be distributed across the circumference of the intermediate housing in a manner that is corresponding to the loads that are present in the given case.

PARTS LIST

1 jet engine
3 inlet area
5 fan
7 bypass duct
9 core stream channel
11 inlet housing
13 fan housing
14 guide blade housing
15 shroud device; intermediate housing
17 sheath flow housing
19 central axis
21 internal shroud appliance
23 external shroud appliance
25 connection device
27 internal shroud part of the internal shroud appliance
29 external shroud part of the internal shroud appliance
31 blades of the internal shroud appliance
33 other blades
35 internal shroud part of the external shroud appliance
37 external shroud part of the external shroud appliance
39 structured blade
41 aerodynamic blade
42 connecting device
43 connection appliance; flange appliance
45 connection appliance; flange appliance
47 connection area of the internal shroud appliance
49 connection area of the internal shroud appliance
51 connection area of the external shroud appliance
53 connection area of the external shroud appliance
55 bolted connection
57 torsion box
59 cross-sectional plane
61 blade; king strut
A axial direction of the shroud device
R radial direction of the shroud device
U circumferential direction of the shroud device

The invention claimed is:
1. A shroud device of a jet engine, comprising:
a radially internal shroud appliance;
a radially external shroud appliance,
wherein the radially internal shroud appliance includes a radially internal ring-shaped first shroud part and a radially external ring-shaped second shroud part, which in an installation position of the shroud device, limit at least a portion of a core stream channel of the jet engine,
wherein the radially internal shroud appliance includes a plurality of blades extending in a radial direction of the shroud device between the radially internal ring-shaped first shroud part and the radially external ring-shaped second shroud part,
wherein the radially external shroud appliance includes a radially internal ring-shaped third shroud part and a radially external ring-shaped fourth shroud part, which in the installation position of the shroud device, limit at least a portion of a bypass duct of the jet engine,
wherein the radially external shroud appliance includes a plurality of blades which extend in the radial direction of the shroud device between the radially internal ring-shaped third shroud part and the radially external ring-shaped fourth shroud part,
wherein the radially internal shroud appliance is a first one-piece cast structural component and the radially external shroud appliance is a second one-piece cast structural component;
wherein the plurality of blades of the radially external shroud appliance includes a plurality of structured blades extending in the radial direction between the radially internal ring-shaped third shroud part and the radially external ring-shaped fourth shroud part, and a plurality of aerodynamic blades, wherein the plurality of structured blades have an increased length in an axial direction of the shroud device as compared to the plurality of aerodynamic blades;
wherein in the installation position of the shroud device, ends of the plurality of aerodynamic blades that are located upstream as well as ends of the plurality of structured blades that are located upstream lie in a cross-sectional plane that extends perpendicularly to a central axis of the shroud device.

2. The shroud device according to claim 1, wherein the radially internal shroud appliance is made from a light metal material.

3. The shroud device according to claim 2, wherein the radially internal shroud appliance is made from at least one chosen from a magnesium material, a titanium material and an aluminum material.

4. The shroud device according to claim 1, wherein the radially external shroud appliance is made from a light metal material.

5. The shroud device according to claim 1, and further comprising a connection flange assembly connecting the radially internal shroud appliance and the radially external shroud appliance, wherein the radially internal shroud appliance and the radially external shroud appliance respectively comprise one connection component of the connection flange assembly.

6. The shroud device according to claim 5, wherein the connection components of the radially internal shroud appliance and of the radially external shroud appliance respectively have a connection area that is located upstream and a connection area that is located downstream in the installation position of the shroud device, wherein the connection area of the radially internal shroud appliance that is located upstream has a smaller outer diameter as compared to the connection area of the radially internal shroud appliance that is located downstream, and the connection area of the radially external shroud appliance that is located upstream has a smaller inner diameter as compared to the connection area of the radially external shroud appliance that is located downstream.

7. The shroud device according to claim 1, and further comprising a releasable connection connecting the radially internal shroud appliance and the radially external shroud appliance to each other.

8. The shroud device according to claim 7, wherein the releasable connection is a screw connection.

9. The shroud device according to claim 1, and further comprising a weld joint connecting the radially internal shroud appliance and the radially external shroud appliance to each other.

10. The shroud device according to claim 1, wherein the radially external shroud appliance comprises at least one connecting flange for coupling the jet engine to an aircraft.

11. The shroud device according to claim 1, wherein the plurality of blades of the radially external shroud appliance are identical.

12. The shroud device according to claim 1, wherein an end area of the plurality of structured blades that is arranged upstream is structurally identical to a first third of the plurality of aerodynamic blades that have a shortest length in the axial direction.

13. The shroud device according to claim 1, wherein end areas of the plurality of structured blades that are arranged upstream are structurally identical to an end area of the plurality of aerodynamic blades that are arranged upstream and that have a shortest length in the axial direction, wherein the end areas of the plurality of structured blades extend at least over a first third of an entire axial length of the shortest length.

14. The shroud device according to claim 1, wherein a length of the structured blades in the axial direction of the shroud device is at least 1.5 times a length of the plurality of aerodynamic blades in the axial direction of the shroud device.

15. The shroud device according to claim 1, wherein the radially external shroud appliance is made from at least one chosen from a magnesium material, an aluminum material, a titanium material and a composite material.

16. The shroud device according to claim 1, wherein a length of the structured blades in the axial direction of the shroud device is at least twice a length of the plurality of aerodynamic blades in the axial direction of the shroud device.

17. A shroud device of a jet engine, comprising:
a radially internal shroud appliance;
a radially external shroud appliance,
wherein the radially internal shroud appliance includes a radially internal ring-shaped first shroud part and a radially external ring-shaped second shroud part, which in an installation position of the shroud device, limit at least a portion of a core stream channel of the jet engine,
wherein the radially internal shroud appliance includes a plurality of blades extending in a radial direction of the shroud device between the radially internal ring-shaped first shroud part and the radially external ring-shaped second shroud part,
wherein the radially external shroud appliance includes a radially internal ring-shaped third shroud part and a radially external ring-shaped fourth shroud part, which in the installation position of the shroud device, limit at least a portion of a bypass duct of the jet engine,
wherein the radially external shroud appliance includes a plurality of blades which extend in the radial direction of the shroud device between the radially internal ring-shaped third shroud part and the radially external ring-shaped fourth shroud part,
wherein the radially internal shroud appliance is a first one-piece cast structural component and the radially external shroud appliance is a second one-piece cast structural component;
wherein the plurality of blades of the radially external shroud appliance includes a plurality of structured blades extending in the radial direction between the radially internal ring-shaped third shroud part and the radially external ring-shaped fourth shroud part, and a plurality of aerodynamic blades, wherein the plurality of structured blades have an increased length in an axial direction of the shroud device as compared to the plurality of aerodynamic blades;
wherein an end area of the plurality of structured blades that is arranged upstream is structurally identical to a first third of the plurality of aerodynamic blades that have a shortest length in the axial direction.

18. A shroud device of a jet engine, comprising:
a radially internal shroud appliance;
a radially external shroud appliance,
wherein the radially internal shroud appliance includes a radially internal ring-shaped first shroud part and a radially external ring-shaped second shroud part, which in an installation position of the shroud device, limit at least a portion of a core stream channel of the jet engine,
wherein the radially internal shroud appliance includes a plurality of blades extending in a radial direction of the shroud device between the radially internal ring-shaped first shroud part and the radially external ring-shaped second shroud part,
wherein the radially external shroud appliance includes a radially internal ring-shaped third shroud part and a radially external ring-shaped fourth shroud part, which in the installation position of the shroud device, limit at least a portion of a bypass duct of the jet engine,
wherein the radially external shroud appliance includes a plurality of blades which extend in the radial direction of the shroud device between the radially internal ring-shaped third shroud part and the radially external ring-shaped fourth shroud part,
wherein the radially internal shroud appliance is a first one-piece cast structural component and the radially external shroud appliance is a second one-piece cast structural component;
wherein the plurality of blades of the radially external shroud appliance includes a plurality of structured blades extending in the radial direction between the radially internal ring-shaped third shroud part and the radially external ring-shaped fourth shroud part, and a plurality of aerodynamic blades, wherein the plurality of structured blades have an increased length in an axial direction of the shroud device as compared to the plurality of aerodynamic blades;
wherein a length of the structured blades in the axial direction of the shroud device is at least 1.5 times a length of the plurality of aerodynamic blades in the axial direction of the shroud device.

* * * * *